US010845781B2

(12) United States Patent
Cartwright et al.

(10) Patent No.: US 10,845,781 B2
(45) Date of Patent: Nov. 24, 2020

(54) INTEGRATED PROCESS CONTROLLER WITH LOOP AND VALVE CONTROL CAPABILITY

(71) Applicant: FISHER CONTROLS INTERNATIONAL LLC, Marshalltown, IA (US)

(72) Inventors: Carter B. Cartwright, Ames, IA (US); Thomas A. Brandau, Nevada, IA (US); Jim Anctil, Marshalltown, IA (US); Jordan E. Mandernach, Adel, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 106 days.

(21) Appl. No.: 15/077,308

(22) Filed: Mar. 22, 2016

(65) Prior Publication Data
US 2016/0282851 A1    Sep. 29, 2016

Related U.S. Application Data

(60) Provisional application No. 62/137,197, filed on Mar. 23, 2015.

(51) Int. Cl.
G05B 19/4155    (2006.01)
G05B 19/042    (2006.01)

(52) U.S. Cl.
CPC ........ *G05B 19/4155* (2013.01); *G05B 19/042* (2013.01); *G05B 2219/24153* (2013.01);
(Continued)

(58) Field of Classification Search
CPC .............. G05B 19/4155; G05B 19/042; G05B 2219/45006; G05B 2219/31119; G05B 2219/24153; G05B 2219/41303
(Continued)

(56) References Cited

U.S. PATENT DOCUMENTS 5,032,525 A * 7/1991 Lee ...................... B29C 35/0288
264/40.3
5,170,341 A * 12/1992 Sklaroff ............... G05B 13/024
700/42
(Continued)

FOREIGN PATENT DOCUMENTS

CA    2 492 656 A1    4/1998
CN    1232553 A    10/1999
(Continued)

OTHER PUBLICATIONS

Aziz-S.,Development of Water Pressure and Distribution Monitoring System Using PLC and SCADA, Masters Thesis, Jul. 2013, 37 pages (Year: 2013).*
(Continued)

*Primary Examiner* — Thomas C Lee
*Assistant Examiner* — Charles Cai
(74) *Attorney, Agent, or Firm* — Marshall, Gerstein & Borun LLP

(57) ABSTRACT

An integrated controller configured to operate in a field includes a network interface module, one or more function modules, and an output module. The network interface module is configured to receive, from a remote host via a communication link, a setpoint for a process variable. The one or more function modules are configured to (i) receive a measurement of a process variable from a field device and (ii) execute logic for a control loop including the field device based at least in part on the measurement of the process variable and the setpoint for the process variable, to generate an output signal independently of the remote host, where the output signal is for controlling the field device. The output module is configured to directly apply the generated output signal to the field device.

19 Claims, 5 Drawing Sheets

(52) U.S. Cl.
CPC .............. *G05B 2219/31119* (2013.01); *G05B 2219/41303* (2013.01); *G05B 2219/45006* (2013.01)

(58) Field of Classification Search
USPC .......................................................... 700/42
See application file for complete search history.

(56) References Cited

U.S. PATENT DOCUMENTS

| | | | | |
|---|---|---|---|---|
| 5,406,474 | A | * | 4/1995 | Hansen ................ G05B 13/045 700/37 |
| 5,549,137 | A | * | 8/1996 | Lenz ...................... G05D 7/005 137/486 |
| 5,831,340 | A | * | 11/1998 | Kobayashi .............. F02N 15/00 290/38 R |
| 5,970,430 | A | * | 10/1999 | Burns ................ G05B 19/0425 702/122 |
| 6,056,008 | A | * | 5/2000 | Adams ............... G05D 16/2093 137/487.5 |
| 2001/0035512 | A1 | * | 11/2001 | Messer .................. F16K 31/02 251/129.04 |
| 2004/0170138 | A1 | | 9/2004 | Blevins et al. |
| 2006/0190099 | A1 | * | 8/2006 | Nangoy ............... G05B 13/021 700/28 |
| 2007/0010968 | A1 | * | 1/2007 | Longsdorf ............. G08C 19/02 702/183 |
| 2009/0138128 | A1 | * | 5/2009 | Fusi .......................... F02C 3/30 700/282 |
| 2010/0256784 | A1 | | 10/2010 | Seberger |
| 2010/0274528 | A1 | * | 10/2010 | Lecuyer ............. G05B 19/0428 702/183 |
| 2012/0293015 | A1 | * | 11/2012 | Johnson .................... H03F 3/08 307/117 |
| 2013/0041484 | A1 | * | 2/2013 | Pratt ...................... G05B 19/05 700/42 |
| 2013/0282150 | A1 | * | 10/2013 | Panther ................ G05B 19/042 700/75 |
| 2014/0214186 | A1 | | 7/2014 | Panther et al. |
| 2015/0046697 | A1 | * | 2/2015 | Galpin ................ H04L 63/0884 713/155 |
| 2015/0293536 | A1 | * | 10/2015 | Mills ....................... E21B 43/24 700/282 |
| 2015/0330188 | A1 | * | 11/2015 | Moreno ................ E21B 33/124 166/250.01 |
| 2017/0074070 | A1 | * | 3/2017 | Hay ........................ E21B 34/14 |

FOREIGN PATENT DOCUMENTS

| | | |
|---|---|---|
| CN | 1490690 A | 4/2004 |
| CN | 1918575 A | 2/2007 |
| CN | 200959088 Y | 10/2007 |
| CN | 201363991 Y | 12/2009 |
| CN | 201903776 U | 7/2011 |
| CN | 102768512 A | 11/2012 |
| CN | 103058359 A | 4/2013 |
| CN | 103970082 A | 8/2014 |

OTHER PUBLICATIONS

"Fisher™ FIELDVUE™ DVC6200 SIS Digital Valve Controller for Safety Instrumented Systems (SIS)," Instruction Manual (2016), 8 pages.
"Fisher™ FIELDVUE™ DVC6200 SIS Digital Valve Controller," Instruction Manual (2016), 8 pages.
"Fisher™ FIELDVUE™ DVC6200 SIS Digital Valve Controllers for Safety Instrumented System (SIS) Solutions Instruction Manual (Supported)," Supported Product (2013), 57 pages.
International Preliminary Report on Patentability Application No. PCT/US2016/023667, dated Sep. 26, 2017.
International Search Report and Written Opinion for Application No. PCT/US2016/023667, dated Jun. 24, 2016.
Office Action issued in Chinese Patent Application No. 201610169128. X, dated Sep. 25, 2019.
Office Action issued in European Patent Application No. 16 716 991.1, dated Feb. 13, 2020.
Examination Report issued in GCC Patent Application No. 2016-31033, dated Feb. 26, 2020.
Examination Report issued in GCC Patent Application No. 2016-31033, dated Aug. 28, 2020.
Office Action issued in Russian Patent Application No. 2017134466, dated Aug. 30, 2019.

* cited by examiner

INTEGRATED PROCESS CONTROLLER WITH LOOP AND VALVE CONTROL CAPABILITY

FIELD OF THE DISCLOSURE

The present invention relates generally to process plant systems and, more particularly, to controllers capable of driving control loops in a field.

DESCRIPTION OF THE RELATED ART

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Process control systems, such as those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches, and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as field devices conforming to the well-known Fieldbus protocol may also perform control calculations, alarming functions, and other control functions commonly implemented within the controller. The process controllers, which are also typically located within the plant environment, receive signals indicative of process measurements made by sensors and/or field devices and/or other information pertaining to the field devices and execute a controller application that runs, for example, different control modules that make process control decisions, generate control signals based on the received information and coordinate with the control modules or blocks being performed in the field devices, such as HART®, Wireless HART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

FIG. 1 illustrates an example known system 10, in which a valve 10 operates in a pipeline 12 to maintain a certain flow rate, pressure, or another variable. A PID controller 14 implements the proportional-integral-derivative (PID) logic for a control loop that includes the valve 10. To this end, the PID controller 14 receives sensor measurements from a sensor 20 (in this example, a pressure sensor), which a transmitter 22 communicates to the PID controller 14 via a set of communication links 40. The PID controller 14 also provides commands for controlling the valve 10 to an I/P positioner 30 via the communication links 40, and the I/P positioner 30 can operate upon an actuator 42 to actuate (e.g., open and close) the valve 10. The PID controller 14 can receive commands from, and provide reports to, an operator workstation 50. The PID controller 14 also can be communicatively coupled to a database that stores diagnostics data, historical data, etc.

In some implementations, the communication links 40 can include wired links interconnected via hubs, switches, etc., and/or wireless links forming a mesh network. In any case, the PID controller 14 exchanges information with the devices 30, 22, etc. via a relatively complex communication path, and may control the loop with a significant delay. For example, the PID controller 14 can receive, from the operator workstation 50, a new setpoint for the flow rate in the pipeline 12 and begin executing PID control by transmitting specific valve positioning commands to the I/P positioner 30. In response to pressure measurements from the pressure sensor 20 or, more generally, sensor measurements reported by sensor operating in the field, the PID controller 14 may provide new positioning commands. Thus, to drive the valve 10 to the new setpoint within a certain period of time, the controller 14 and the devices 30, 22 may exchange numerous messages, each having a potentially significant propagation delay.

For similar reasons, the PID controller 14 cannot carry out diagnostic, prognostic, maintenance functions, and other functions related to the valve 10 (or the control loop including the valve 10) without a delay. For example, to collect diagnostics data for storage in the database 52, the PID controller 14 may need to transmit multiple requests for data and collect multiple responses via the communication links 40.

In addition to propagation delays, the system 10 has several other limitations. For example, the components 20, 22, and 30 must be procured, installed, wired, and maintained separately, thereby increasing complexity, cost, demands on personnel, etc. Moreover, the relatively large number of separate devices operating in control loops makes diagnostics more difficult.

SUMMARY

An integrated digital process controller of this disclosure is configured to operate in a field to locally perform process value measurements and implement PID control. The controller can receive a setpoint from a remote host for a process variable, such as pressure or flow rate in a pipeline, and locally, independently of the remote host, carry out control of a loop that includes a field device such as a valve. In particular, the controller can implement control without communicating measurements or receiving adjusted control parameters from the remote host. Components operating within the controller can exchange data at wire speed over small distances, in some cases even at on-chip speed, thereby making control quick and efficient. The controller can operate in a local loop, a distributed control system, or a SCADA system.

In addition to the implementing PID control, the controller can perform real-time learning and diagnostics using data stored locally, e.g., in a non-volatile memory module of the integrated module. The controller can generate alerts and alarms based on the locally performed measurements and diagnostics. The controller can store this as well as signature data for efficient comparison in local memory, thereby eliminating the need to report measurements to a remote host and rely on the remote host for calculation. The controller can perform diagnostics not only on the field device but on the entire control loop, and similarly can adjust parameters related to both the field device and the control loop. Moreover, the controller can optimize control loop performance for all process variable types, such as flow, pressure, level, density, pH, temperature, composition, etc.

According to some implementations, the controller is assembled in a modular manner to enable quick and cost-efficient of components such as sensors, VP converters, etc. Thus, a component can be easily replaced in the event of failure or when an upgrade is available. Further, the controller can be equipped with redundant components to ensure immediate service restoration (e.g., hot swap) in the event of failure and supports voting logic in discrete applications.

In some embodiments, the controller further can include one or more of the following features: (i) the housing of the controller can be explosion-proof and compliant with intrinsic safety (IS) standards; (ii) the controller can include no-bleed pneumatics, to be used in natural gas applications, for example; (iii) the controller can include a power source that can provide sufficient power to the CPU and/or other processing units to carry PID calculations, support transmissions, and otherwise support largely autonomous operation of the controller in the field; (iv) the controller can receive setpoint data from, as well as provide alerts, alarms, and reports to, a remote host via a wireless link; (v) the controller can support Ethernet connectivity, (vi) in addition to wired or wireless interface for communicating with a remote host, the controller can include a local user interface for receiving configuration data and displaying alerts or alarms, for example; (vii) the controller also can support remote use interface (RUI) for a standard operating platform used by a remote host, such as Windows®, for example; and (viii) the controller can include analog output (AO) and analog input (AI) 4-20 mA modules to operate with legacy field devices.

DETAILED DESCRIPTION OF THE DRAWINGS

DETAILED DESCRIPTION

Figure 2:
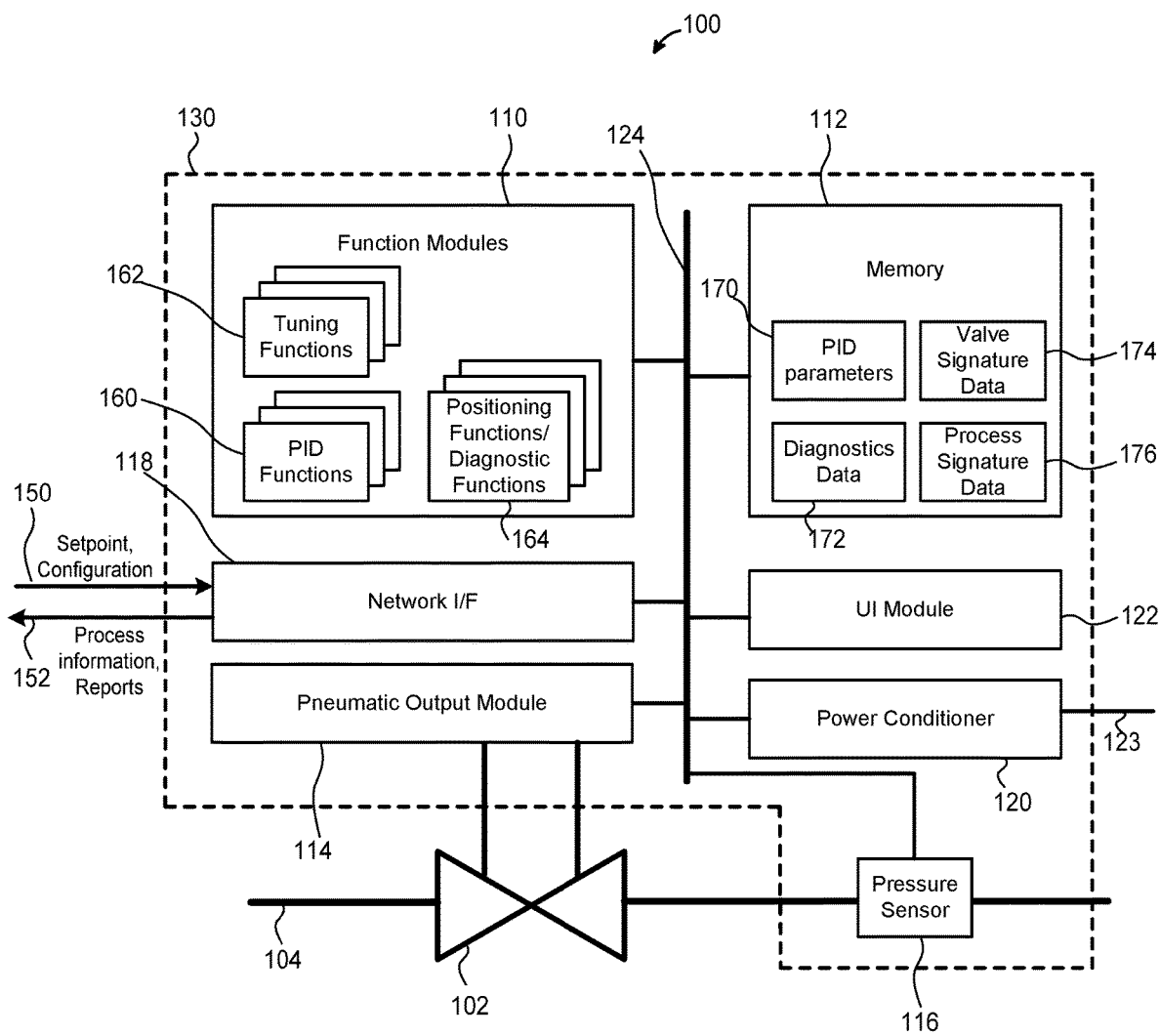
FIG. 2 is a block diagram of an example integrated controller of this disclosure.

FIG. 2 illustrates an example integrated digital process controller (for simplicity, "controller") 100 capable of carrying out control in a field using local measurements and local control functions. As discussed below, the controller 100 is capable of fast, dynamic in situ process control for various types of process variables, performance optimization, real-time diagnostics, etc. By implementing PID control directly at a valve or another field device, the controller 100 can deliver improved loop performance. Moreover, the controller 100 effectively replaces several devices, thereby simplifying installation and maintenance. A single supplier can provide the controller 100 for total loop control.

Figure 1:
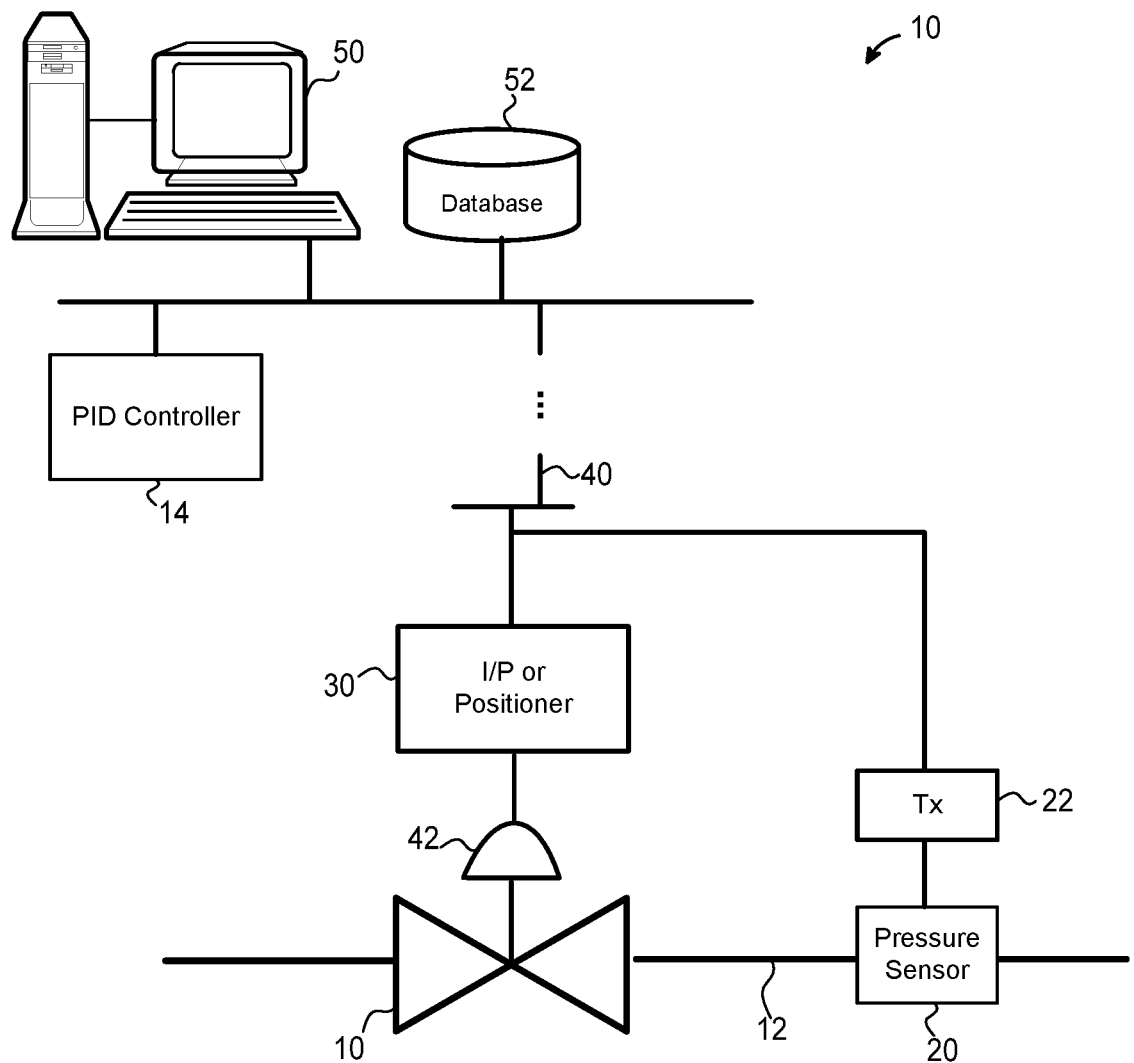
FIG. 1 is a block diagram of a known remote terminal unit coupled to a field device.

In the example configuration of FIG. 2, the controller 100 operates on a valve 102 installed in a pipeline 104. The valve 102 and the pipeline 104 can be similar to the valve 10 and the pipeline 12 discussed above with reference to FIG. 1. The controller 100 includes function modules 110, a memory 112 and a pneumatic output module 114. In some implementations, the controller 100 also can include a sensor, such as a pressure sensor 116. Further, the integrated controller 100 can include a network interface module 118 and a power conditioner 120. Still further, the integrated controller 100 can be equipped with a local user interface module 122. Depending on the implementation, the components 100-120 can reside in a same housing 130, or some of the components (e.g., the pressure sensor 116) can be provided in a separate housing, but in any case the components 100-122 can be interconnected using direct local wired links, or other suitable types of short-range, high-speed communication links. In an example implementation, the components 100-122 are coupled to a backplane 124. The controller 100 can receive a setpoint for a process variable and configuration data via a communication line 150, and provide process information and reports to a remote host via a communication line 152. The lines 150 and 152 are not necessarily physically separate channels, and in general can be communication channels on a same wire or a set of wires, different radio channels or different timeslots of a same channel, or any other suitable types of physical or logic channels.

Next, the components 110-124 are briefly considered individually, followed by a discussion of operation of the controller 100.

Depending on the implementation, the function modules 110 can include a general-purpose central processing unit (CPU) configured to execute instructions stored in the memory 112 and/or one or several special-purpose modules, such as application-specific integrated circuits (ASICs) configured to execute PID functions. The CPU can include a real-time clock accurate to within a certain number of minutes (e.g., 10) per year over the entire range of temperatures at which the controller 100 can operate. More generally, the function modules 110 can include one or more processors of any suitable type. As schematically illustrated in FIG. 2, the function modules 110 can implement one or several PID functions 160, one or several tuning functions 162, one or several real-time positioning and/or diagnostics functions 164, and, if desired, additional functions related to monitoring, troubleshooting, process variability optimization, etc. The function modules 110 can implement these functions in hardware, firmware, software instructions executable by one or more processors, or any suitable combination of hardware, firmware, and software.

In an example scenario, the function modules 110 receives a pressure setpoint via a communication line 150 for the pipeline 104 from a remote host via the network interface 118, receives sensor data from the pressure sensor 116, executes a PID algorithm to generate a positioning command (or, more generally, an output signal), and applies the positioning command to the valve 102 via the pneumatic output module 114. It is noted that the function modules 110 can receive a setpoint for a process variable rather than for a field device. The function modules 110 can retrieve the tuning parameters for the PID loop from the memory 112. These parameters can be pre-configured, received from a remote host, determined and/or adjusted used auto-tuning, etc., as discussed in more detail below. Thus, the function module 110 can use locally collected sensor data to locally, without relying on a remote host, execute control functions. Depending on the implementations, the function modules 110 can implement functions to control many different process variables, such as pressure, position, temperature, flow rate, or pH.

More generally, the function modules 110 allow the integrated controller 100 to quickly and efficiently react to device issues (e.g., detect a problem with the valve 102, detect failure of the sensor 116), control loop issues (e.g., determine that PID parameters should be adjusted), carry out emergency procedures (e.g., shut down flow through the pipeline 104), generate alerts for output via the local UI module 122 and/or for reporting to a remote host.

The memory 112 can be any suitable non-transitory computer-readable medium and can include volatile and/or non-volatile components. Thus, the memory 112 can include random-access memory (RAM), a hard disk, a flash drive, or any other suitable memory components. The memory 112 can store PID parameters 170, diagnostics data 172, valve signature data 174, and process signature data 176. In particular, the PID parameters 170 can specify proportional, derivate, and integral gain values for a loop controlling the valve 102 or another field device. The PID parameters 170 can be provided configured by a remote operator via a remote host and provided via the network interface 118, a local operator via the UI module 122, pre-stored in the memory 112 by the manufacturer of the integrated controller 100, etc. In some scenarios, the integrated controller 100 can adjust PID parameters 170 in response to receiving a new setpoint 150 or upon conducting diagnostics, for example.

The valve signature data 174 and the process signature data 176 can describe expected behavior of the valve 102 and the loop for controlling the valve 102, respectively. For example, a valve signature can include a set of expected sensor measurements corresponding to a set of respective positions of the valve 102. In the example implementation of FIG. 2, the valve signature can specify how the pressure sensor 116, disposed downstream of the pressure sensor 116 and thus corresponding to the output pressure of the valve 102, relates to the travel positions of the valve 102 (which can be measured as the position of the travel actuator or the percentage of the open position, for example). Similarly, a process signature data can describe expected process output values, such as pressure measurements from the pressure sensor 116, in response to the changes in the setpoint value or an input value. More generally, signatures stored in the memory 112 can describe the expected response of a sub-system to input signals, for comparing to the actual response of the sub-system and determining whether the sub-system operates properly.

Unlike the systems known today, the integrated controller 100 can locally collect data for determining the actual response to a sub-system such as the valve 102 and again locally compare the collected data to the signature 174, the signature 176, or another signature. In this manner, the integrated controller can quickly and efficiently detect valve problems (e.g., actuator being stuck, pressure loss, leakage of fluid), process upsets, control loop degradation, etc. Further, if desired, the integrated controller 100 can execute the appropriate tuning function 162 to create a process signature. Using the process signature, the controller can detect a suitable set of tuning parameters for the desired control loop response.

Further, the memory 112 can retain configuration information, logs, history data, status of input and output ports, etc. The integrated process controller 100 can be configured to retain in the memory 112 an event log, an alert log, real-time clock data, a loop log, historical data, database data, status of input/output channels, function module attributes, user lists, etc., in the event of a power failure.

With continued reference to FIG. 2, the pneumatic output module 114 can actuate the valve 102 during operation. The pneumatic output module 114 can include an I/P transducer and one or more relay components. In an example implementation, the pneumatic output module 114 includes an I/P module and a double-acting relay. Further, in one implementation, the pneumatic output module 114 includes a relay that bleeds and one that locks in the last value in the event of a power failure. The controller 100 can provide indications of output pressure of the pneumatic output module 114 via the local UI 122 or the RUI of a remote host. It is noted that the controller 100 can monitor operation of the pneumatic output module 114 by sensing output pressure, for example, and perform real-time diagnostics to detect complete or partial failure early.

When used in applications in which natural gas is the medium, the controller 100 can include one or several no-bleed pneumatic components to comply with emission regulations. The controller 100 in these implementations allows continued use of the medium while reducing the emissions compared to traditional pneumatic devices.

In an example implementation, the pressure sensor 116 is an integral pressure sensor module configured to measure pressure as the process variable (PV). The pressure sensor 116 may bolt directly to the housing 130. In alternative implementations, however, the pressure sensor 116 can be provided as a separate device coupled to the controller 100 by a wired link or a short-range wireless link. Similar to the pneumatic output module 114 discussed above, the controller 100 can display live data for the pressure sensor 116 via the (local) UI module 122 or the RUI at the remote host. Further, the controller 100 can support commands using which an operator can request, or pull, live data via the local or remote interface.

Although the example implementation depicted in FIG. 2 includes a pressure sensor 116 integral with the remaining assembly of the controller 100, in other implementations the controller 100 can include additional 110 modules such as a valve position sensor or a temperature sensor. These and other modules can be inserted into the backplane 124, or the controller 100 can communicate with the additional modules via short-range communication links.

The network interface module 118 can support general-purpose protocols such as the Internet Protocol (IP) as well as special-purpose process control and industrial automation protocols designed to convey commands and parameters for controlling a process plant, such as Modbus, HART, Profibus, etc. The network interface module 118 can support wired and/or wireless communications. As discussed above, the controller 100 can receive a setpoint value from a remote host via a long-range communication link to which the network interface module 188 is coupled. The network interface module 118 can support Ethernet ports and, in some implementations, implement protection against unauthorized access.

Still referring to FIG. 2, the power conditioner 120 can receive power from a power supply via line(s) 123 to provide sufficient power for the function modules 110 to carry out PID control and communicate with local as well as remote devices. The power conditioner 120 can include a DC-to-DC converter, for example, to convert 8-30V of DC power to the level necessary to power the components coupled to the backplane 124. Generally speaking, the power conditioner 120 can ensure a substantially autonomous operation of the controller 100 to control the valve 102 and the corresponding control loop.

The local user interface module 122 can include any suitable display, such as a liquid crystal display (LCD), a keyboard and/or a touchscreen, etc. In some implementations, the user interface module 122 also can include an audio output device such as speaker and/or an audio input device such a microphone. In other implementations, the components of the user interface module 122 are selected in view of intrinsic safety considerations to minimize the risk of explosion. Further, the controller 100 can support remote user interface for accessing certain features and/or data stored in the controller 100 from a remote host, such as the host 50 discussed above with reference to FIG. 1.

The backplane 124 can be a component with no active circuitry, residing in the housing 130 and having connections for mounting various modules. As illustrated in FIG. 2, the backplane 124 can interconnect the function modules 110, the memory 112, the network interface 118, the power conditioner 120, the UI module 122, the pneumatic output module 114, etc. The backplane 124 in general can include connections to receive power, select lines, communication ports, etc. In some implementations, the CPU module is selected or designed so as to prevent mis-insertion into the backplane 124.

The housing 130 can be explosion-proof, compliant with intrinsically safety (IS) standards. In some implementations, the integrated controller 100 includes barriers to interface to the pressure sensors/IP, and the display to keep the integrity of the disclosure as Class 1 Division 1 (C1D1) explosion-proof.

As indicated above, the controller 100 can have modular design to allow removal/swap of disabled or obsolete components. In some implementations, the controller 100 can support hot swap, or replacement of components without taking the system offline. Modular and flexible design can allow certain operators to customize the system by equipping the controller 100 with only some of the modules and/or easily replace components. For example, the controller 100 can be provided without a pressure sensor or without a pneumatic output module. Further, the control strategy can be customized by selecting desired electronic I/O or function modules for connection to the backplane 124.

In operation, the controller 100 can perform real-time prognostics to allow operators to quickly gain accurate insight into process changes, issues related to the valve 102, transmissions and communications, control maintenance, etc. Thus, the controller 100 can carry out control functions in the field. In other words, rather than operating based on commands generated by a remote host that implements a PID loop, the controller 100 can control the valve 102 and/or loop parameters locally and, if desired, report information to a host via a communication network via the communication line 152.

Further, although the controller 100 can receive the setpoint value 150 via a wireless communication link, which may introduce a communication delay, the controller 100 then can drive the process variable to the setpoint using wired signaling between components within the same devices, or even on-chip signaling. More specifically, the controller 100 need not report pressure, position, temperature, level, flow rate, or other measurements to another device capable of calculating new control signals. Updates to the setpoint therefore may be limited by the speed of wireless communications, but communications between sensors, modules calculating proportional, derivate, and integral values, etc. occur at higher speeds.

In general, the techniques discussed below can be used in a variety of applications, such as upstream oil and gas, midstream oil and gas, liquid pipelines, gas transmission, gas distribution, electric power, chemical, petrochemical, refining, pulp and paper, food and beverage, pharmaceutical, water and wastewater, mining and metal, liquid distribution, liquefied natural gas (LNG) liquefaction and gasification. Further, these techniques can be used with both continuous and discrete control schemes to ensure accurate process control at a valve, enable real-diagnostic capabilities, and provide one or more of the other advantages discussed in this disclosure. In short, the controller 100 can increase efficiency, reduce downtime, provide a cost-effective option, etc.

Figure 3:
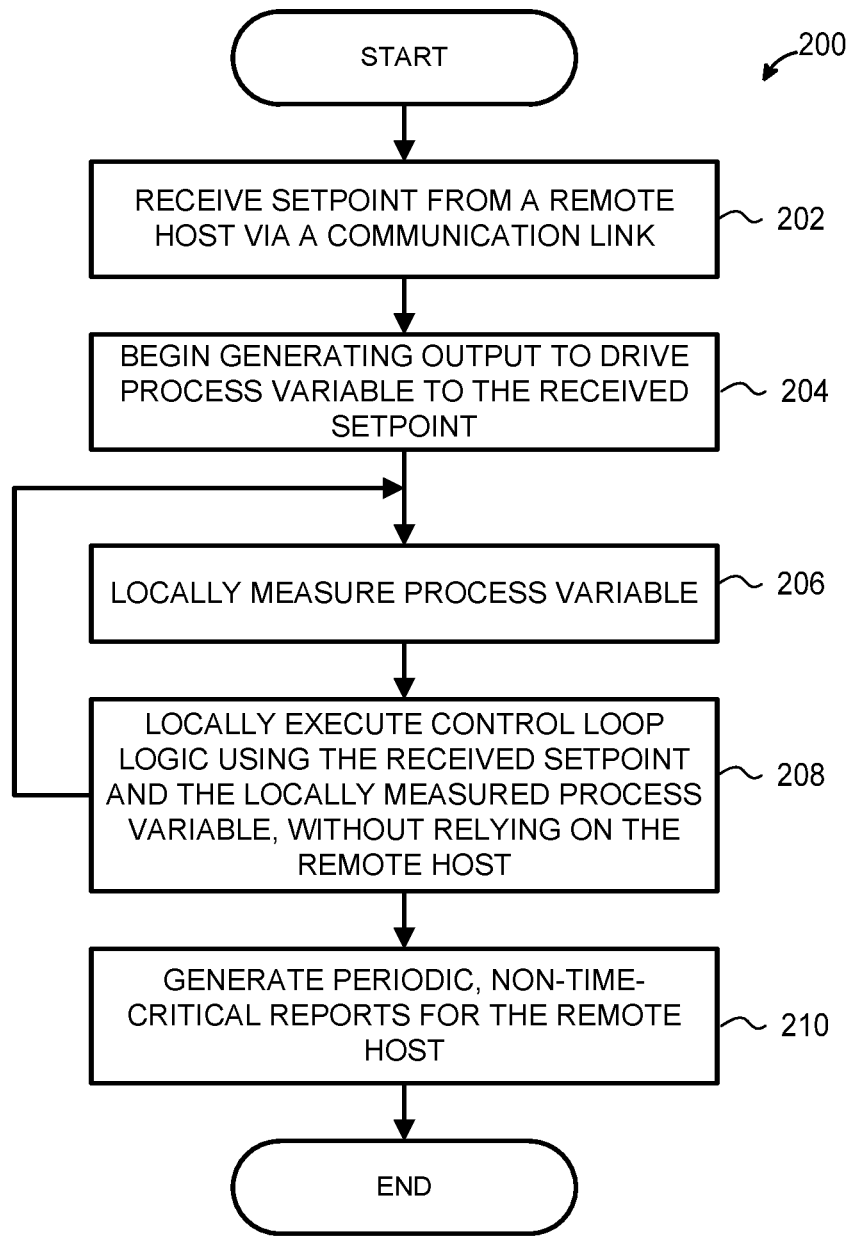
FIG. 3 is a flow diagram of an example method for executing PID control of a loop in accordance with the techniques of this disclosure.

For further clarity, example operation of the controller 100 to control a process loop is briefly discussed with reference to FIG. 3. A method 200 of FIG. 3 can be implemented in the function modules 110 and the memory 112 as a set of software or firmware instructions, for example. The method 200 begins at block 202, where a setpoint is received from a remote host via a communication link. The setpoint can be pressure or flow rate in a pipeline, for example.

At block 204, a controller begins to generate output to drive the loop to the received setpoint, using locally stored PID parameters. These parameters, which can include gains for the proportional, derivative, and integral blocks, can be stored in the memory 112, for example. Depending on the implementation and/or scenario, the controller is pre-configured with these parameters, or the controller receives these parameters during a separate configuration procedure. As indicated above, the controller in some cases may dynamically adjust these parameters.

At block 206, the process variable is measured locally using a sensor integral with the controller or coupled to the controller via a short-range communication link. The control loop then is executed locally at block 208. For example, the controller 100 can execute PID logic without relying on a remote host and without reporting intermediate measurements (e.g., the measurements collected at block 206) to the remote host. When executing the PID logic, logical or physical blocks within the controller can exchange data at wire speed or at on-chip speed, depending on the implementation. In any case, the speed at which components of the controller exchange data is substantially higher than the speed at which the controller can communicate with a remote host. The method 100 can include multiple calculations and measurements at block 206 and 208, until the set point is reached.

A report optionally can be provided to the remote host at block 210. The report can include non-time-critical data, and can be delivered via the relatively slow wired or wireless links to the remote host. If desired, output also can be provided via a local user interface.

Figure 4:
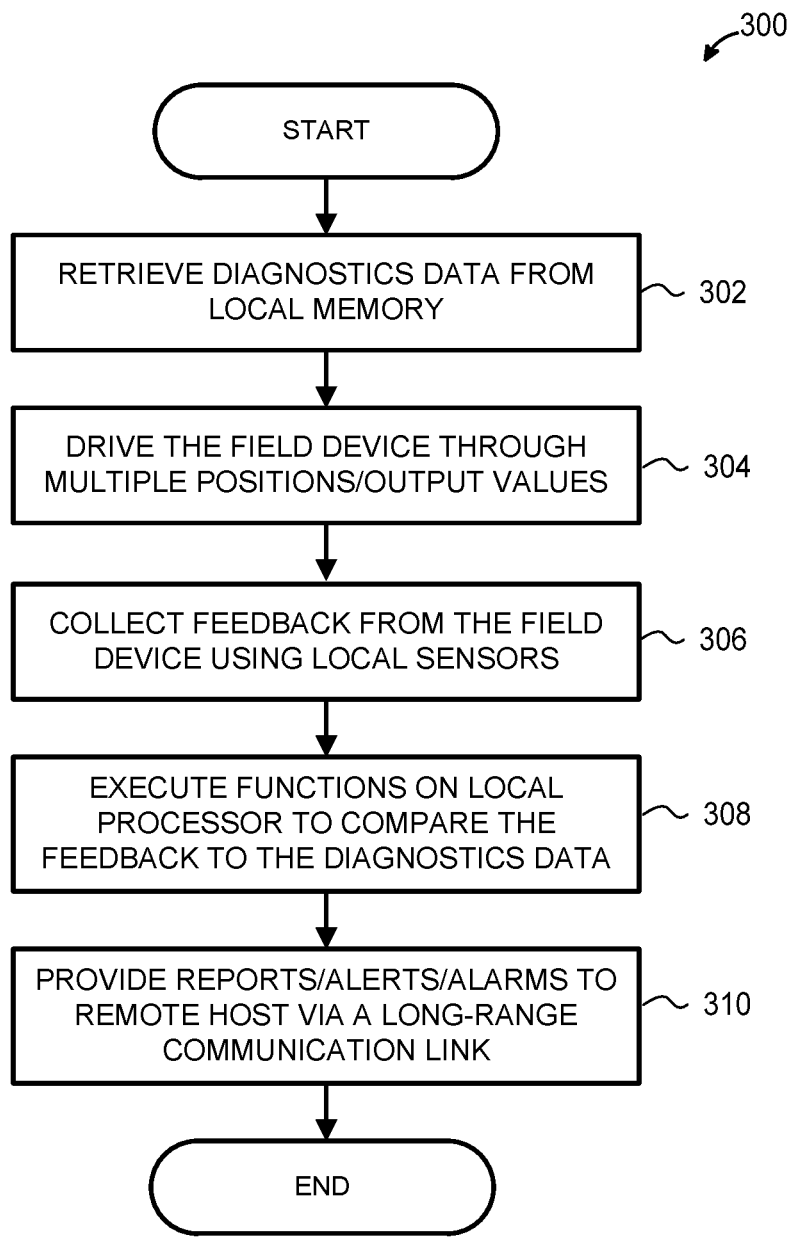
FIG. 4 is a flow diagram of an example method for conducting diagnostics in situ at an integrated controller of this disclosure.

Now referring to FIG. 4, a method 300 also can be implemented in the function module 110 and the memory 112 as a set of software or firmware instructions. According to the method 300, a controller executes in situ diagnostics, again without relying on external or remotely disposed controllers, hosts, or databases. The controller can execute the method 300 when the field device is not operational, for example, or shortly after installation and prior to going online.

At block 302, diagnostics data is retrieved from a local memory, such as the memory 112 discussed above. The diagnostics data can include a valve signature, a process signature, or other data for comparing to the current output of the field device. A controller then can drive the corresponding field device (e.g., the valve 102) through multiple positions to generate output values (block 304). At block 306, feedback or another output value is collected from the field device using local sensors and local P/I transducers. Next, at block 308, local processing can be carried out to compare the stored diagnostics data to the actual output of the field device to determine whether the output matches the diagnostics data and, in the event of deviation, whether an alert or an alarm should be generated.

Blocks 304-308 can be executed in real time and using local processing capabilities rather than a remote host. Blocks 304-208 can be executed repeatedly, periodically, or according to any suitable schedule.

Figure 5:
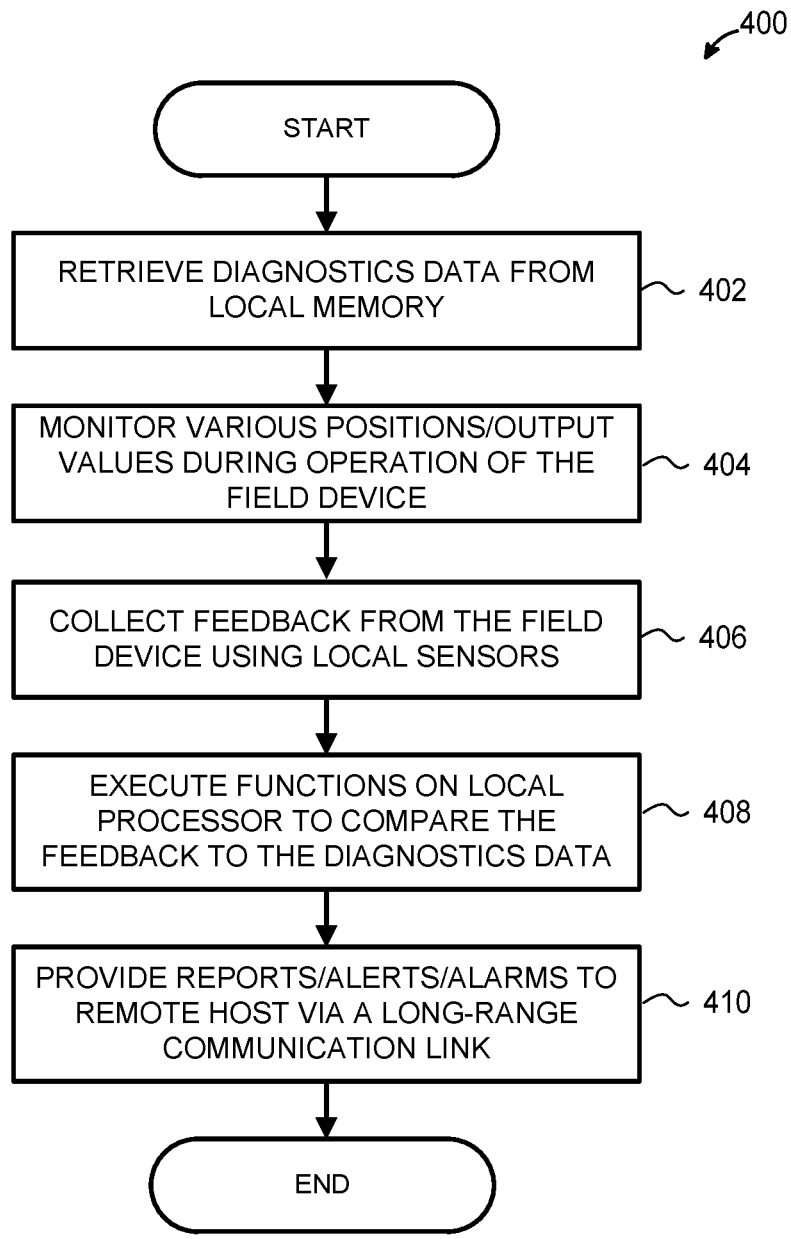
FIG. 5 is a flow diagram of an example method for conducting real-time diagnostics during operation of a field device or a control loop, which can be implemented in the integrated controller of this disclosure.

FIG. 5 illustrates another method for conducting diagnostics, which can be implemented in the controller 100 or another controller consistent with this disclosure. Unlike the method 300 discussed above, the method 400 does not require that the field device be driven through a set of values during a test session or a dedicated diagnostics session. Rather, according to the method 400, a controller monitors operation of a field device during operation. In other words, as the field device (e.g., a valve) operates in response to receiving a device setpoint, and/or as a control loop including the field device operates in response to receiving a process variable setpoint, the controller collects sensor data to perform non-intrusive, real-time diagnostics. Accordingly, the method 400 include blocks 402-410 that are generally similar to blocks 302-310 discussed with reference to FIG. 3, except that various positions and/or output values during normal operation of the field device are monitored at block 404.

In some cases, the results of executing blocks 304-308 are reported to an operator and/or a remote host. For example, an alarm can be generated and displayed via the local user interface (e.g., the UI module 122), a report can be sent to a remote host via a long-range communication link, etc. The controller in some scenarios may adjust PID tuning parameters in response to the results of comparing the diagnostics data to the output. In any case, a controller can execute the method 300 to quickly and efficiently perform in situ diagnostics, adjustments, optimization, etc.

GENERAL CONSIDERATIONS

Unless specifically stated otherwise, discussions herein using words such as "processing," "computing," "calculating," "determining," "identifying," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

When implemented in software, any of the applications, services, engines, routines, and modules described herein may be stored in any tangible, non-transitory computer readable memory such as on a magnetic disk, a laser disk, solid state memory device, molecular memory storage device, an optical disk, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The following aspects represent examples of embodiments of the presently described systems and methods. This list of aspects is intended to be non-limiting, as other embodiments are contemplated in view of the present description.

The invention claimed is:

1. An integrated valve controller configured to operate in a field, the integrated valve controller comprising:
   a housing;
   a backplane to removeably receive components and support selective replacement of one or more of the components, wherein the components include a network interface module, one or more function modules, and an output module;
   the network interface module residing in the housing, coupled to the backplane, and configured to receive, from a remote host via a communication link, a setpoint for a process variable;
   a memory readable by the one or more function modules, the memory storing parameters for a control loop;
   a sensor residing in the housing and integral with an assembly of the controller, the sensor configured to generate a measurement of the process variable;
   the one or more function modules residing in the housing, coupled to the backplane, and communicatively coupled to the sensor, the one or more function modules configured to (i) receive the measurement of a process variable and (ii) execute logic for the control loop including a valve based at least in part on the measurement of the process variable and the setpoint for the process variable, to generate an output signal independently of the remote host, wherein the output signal is for controlling the valve; and the output module coupled to the backplane and configured to directly apply the generated output signal to the valve disposed outside the housing.

2. The integrated controller of claim 1, wherein the sensor provides the measurement to the one or more function modules via a short-range communication link.

3. The integrated controller of claim 2, wherein the sensor provides the measurement to the one or more function modules without reporting the measurement to the remote host.

4. The integrated controller of claim 1, wherein:
the network interface module, the one or more function modules, and the output module exchange data at a first speed,
the integrated controller exchanges data with the remote host at a second speed, and
the first speed is substantially higher than the second speed.

5. The integrated controller of claim 1,
wherein the parameters for the control loop include including proportional, derivative, and integral (PID) values for executing PID control.

6. The integrated controller of claim 5, wherein the one or more function modules are configured to adjust one or more of the PID values during operation of the control loop.

7. The integrated controller of claim 5, wherein the memory further stores:
a valve signature specifying a set of pressure values and a set of corresponding travel positions for the valve, and
wherein the one or more function modules are further configured to (i) receive, during operation of the control loop substantially in real time, pressure values and indications of travel positions for the valve, and (ii) compare the received pressure values and indications of the travel positions to the valve signature to determine whether the valve operates properly.

8. The integrated controller of claim 7, wherein the one or more function modules are further configured, in response to detecting that the valve does not operate properly, transmit an alarm message to the remote host.

9. The integrated controller of claim 5, wherein the memory further stores:
a process signature specifying a set of process variable values and a set of corresponding input values, and
wherein the one or more function modules are further configured to (i) receive, during operation of the control loop substantially in real time, process variable values and indications and corresponding input value, and (ii) compare the received process variable values and the corresponding received input values to the process signature to determine whether the control loop operates properly.

10. The integrated controller of claim 9, wherein the one or more function modules are further configured, in response to detecting that the control loop does not operate properly, transmit an alarm message to the remote host.

11. The integrated controller of claim 5, wherein the one or more function modules are further configured to collect, at run time, diagnostics data indicative of performance of one or both of (i) the valve or (ii) the control loop and store the diagnostics data in the memory.

12. The integrated controller of claim 1, further comprising:
a power conditioner to provide power to the one or more function modules, the network interface, and the output module, wherein the provided power is sufficient for autonomous operation of the integrated controller in the field.

13. The integrated controller of claim 1, wherein the execute the logic for the control loop, the one or more function modules is configured to adjust proportional, derivative, and integral (PID) values for the control loop.

14. The integrated controller of claim 1, the housing further comprising explosion-proof assembly.

15. The integrated controller of claim 1, wherein the one or more function modules include a tuning function to automatically adjust PID parameters of the control loop at run time.

16. The integrated controller of claim 1, wherein the output module is a no-bleed pneumatic module.

17. A method for operating a control loop in a field, the method comprising:
receiving, at an integrated controller directly coupled to a valve, a setpoint for a control loop including the valve, from a remote host via a network interface module coupled to a backplane;
monitoring, locally at the integrated controller using a sensor residing in a housing of the integrated controller and integral with an assembly of the controller, a process variable generated by the control loop;
generating, locally at the integrated controller, an output value for driving the control loop to the setpoint based at least in part on the setpoint and the monitored process variable via one or more function modules coupled to the backplane; and
executing, locally at the integrated controller, logic for the control loop to drive the control loop to the setpoint, including applying the generated output value to the valve disposed outside the housing, via an output module coupled to the backplane, wherein the backplane removeably receives a plurality of components including the network interface module, the one or more function modules, and the output module, to support selective replacement of one of the plurality of components.

18. The integrated controller of claim 7, wherein the one or more function modules are further configured, in response to detecting that the valve does not operate properly, adjust the PID parameters of the control loop for a desired control loop response.

19. The integrated controller of claim 1, further comprising a local user interface to display alarms.

* * * * *

UNITED STATES PATENT AND TRADEMARK OFFICE
CERTIFICATE OF CORRECTION

| | |
|---|---|
| PATENT NO. | : 10,845,781 B2 |
| APPLICATION NO. | : 15/077308 |
| DATED | : November 24, 2020 |
| INVENTOR(S) | : Carter B. Cartwright et al. |

It is certified that error appears in the above-identified patent and that said Letters Patent is hereby corrected as shown below:

In the Specification

At Column 3, Line 26, "VP" should be -- I/P --.

At Column 3, Line 56, "DETAILED DESCRIPTION OF THE DRAWINGS" should be -- BRIEF DESCRIPTION OF THE DRAWINGS --.

At Column 5, Line 28, "sensor" should be -- pressure sensor --.

At Column 5, Line 50, "setpoint 150" should be -- setpoint --.

At Column 6, Line 61, "110" should be -- I/O --.

At Column 7, Line 28, "such a" should be -- such as a --.

At Column 8, Lines 8-9, "set-point value 150" should be -- set-point value --.

In the Claims

At Column 11, Lines 20-21, "include including" should be -- include --.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*